United States Patent
Fukukawa et al.

(10) Patent No.: US 12,208,796 B2
(45) Date of Patent: Jan. 28, 2025

(54) VEHICLE CONTROLLER AND VEHICLE CONTROL METHOD

(71) Applicants: ADVICS CO., LTD., Kariya (JP); TOYOTA JIDOSHA KABUSHIKI KAISHA, Toyota (JP)

(72) Inventors: Shogi Fukukawa, Tokyo (JP); Masayuki Asano, Tokyo (JP); Kazuki Miyake, Okazaki (JP); Akitsugu Sakai, Toyota (JP)

(73) Assignees: ADVICS CO., LTD., Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 17/942,645

(22) Filed: Sep. 12, 2022

(65) Prior Publication Data

US 2023/0093196 A1 Mar. 23, 2023

(30) Foreign Application Priority Data

Sep. 17, 2021 (JP) .................... 2021-151869

(51) Int. Cl.
*B60W 30/14* (2006.01)

(52) U.S. Cl.
CPC ..... *B60W 30/143* (2013.01); *B60W 2520/105* (2013.01); *B60W 2540/10* (2013.01); *B60W 2720/10* (2013.01)

(58) Field of Classification Search
CPC ......... B60W 30/143; B60W 2520/105; B60W 2540/10; B60W 2720/10; B60W 2520/10;
(Continued)

(56) References Cited

U.S. PATENT DOCUMENTS 6,213,571 B1 * 4/2001 Yamada ............. B60L 15/2009
 188/158
7,328,955 B2 * 2/2008 Tsukasaki ............ B60T 8/1769
 303/190

(Continued)

FOREIGN PATENT DOCUMENTS

EP 1 849 673 A1 10/2007
JP 2008-285013 A 11/2008
(Continued)

OTHER PUBLICATIONS

Office Action (Notice of Reasons for Refusal) issued Jul. 25, 2023, by the Japan Patent Office in corresponding Japanese Patent Application No. 2021-151869 and an English translation of the Office Action. (7 pages).

(Continued)

*Primary Examiner* — Mussa A Shaawat
(74) *Attorney, Agent, or Firm* — BUCHANAN INGERSOLL & ROONEY PC

(57) ABSTRACT

A vehicle controller sets an upper limit request value related to an upper limit of a longitudinal acceleration of a vehicle, a lower limit request value related to a lower limit of the longitudinal acceleration, and an acceleration request value related to the longitudinal acceleration that corresponds to an amount of the operation of the vehicle. The vehicle controller sets a first arbitration request value to a greater one of the lower limit request value and the acceleration request value. The vehicle controller sets a second arbitration request value to a smaller one of the first arbitration request value and the upper limit request value. The vehicle controller sets, to a value that corresponds to the second arbitration request value, a command value sent to an actuator that operates to adjust the traveling speed.

3 Claims, 4 Drawing Sheets

(58) Field of Classification Search
CPC ....... B60W 2540/12; B60W 2720/106; B60W 2720/30; B60W 10/184; B60W 10/08; B60W 2201/02; B60Y 2300/143
See application file for complete search history.

(56) References Cited

U.S. PATENT DOCUMENTS

| | | | | |
|---|---|---|---|---|
| 8,510,011 | B2* | 8/2013 | Inoue | B60W 10/06 477/34 |
| 8,608,255 | B2* | 12/2013 | Shimada | B60T 8/404 303/3 |
| 9,108,509 | B2* | 8/2015 | Watanabe | B60K 23/0808 |
| 2002/0107106 | A1* | 8/2002 | Kato | B60W 10/06 477/181 |
| 2003/0060961 | A1* | 3/2003 | Ishizu | B60W 10/06 123/352 |
| 2007/0255481 | A1* | 11/2007 | Egawa | B60W 30/16 701/96 |
| 2010/0100295 | A1* | 4/2010 | Inoue | B60W 10/06 701/69 |
| 2010/0121550 | A1* | 5/2010 | Inoue | B60W 10/06 701/93 |
| 2015/0239454 | A1* | 8/2015 | Sujan | B60W 50/0097 701/54 |
| 2015/0291136 | A1* | 10/2015 | Ninoyu | B60T 8/17 701/70 |
| 2017/0259849 | A1* | 9/2017 | Fukukawa | B62D 15/021 |
| 2018/0079397 | A1* | 3/2018 | Nakagawa | B60T 8/17 |
| 2018/0186374 | A1* | 7/2018 | Ando | G05D 1/0088 |
| 2019/0023240 | A1* | 1/2019 | Asano | B60W 40/107 |
| 2019/0276025 | A1* | 9/2019 | Asano | B60W 10/04 |
| 2020/0070802 | A1 | 3/2020 | Yamada | |
| 2020/0070849 | A1 | 3/2020 | Suzuki et al. | |
| 2020/0079389 | A1* | 3/2020 | Asano | F16H 59/48 |
| 2020/0223404 | A1* | 7/2020 | Asano | B60T 7/12 |
| 2022/0017062 | A1 | 1/2022 | Yamada | |

FOREIGN PATENT DOCUMENTS

| | | |
|---|---|---|
| JP | 2017-001519 A | 1/2017 |
| JP | 2020032892 A | 3/2020 |
| JP | 2020032894 A | 3/2020 |

OTHER PUBLICATIONS

The extended European Search Report issued Jan. 23, 2023, by the European Patent Office in corresponding European Patent Application No. 22188698.9-1012. (9 pages).

* cited by examiner

VEHICLE CONTROLLER AND VEHICLE CONTROL METHOD

BACKGROUND

1. Field

The present disclosure relates to a vehicle controller and a vehicle control method that control a traveling speed of a vehicle.

2. Description of Related Art

Japanese Laid-Open Patent Publications No. 2020-32892 and No. 2020-32894 each disclose an example of a controller that includes an arbiter unit. The arbiter unit arbitrates requests from application requesting units, which perform a driver assistance function. Based on a result of arbitration, the controller derives command values to be sent to controlling units that respectively control multiple actuators.

In some cases, the driver operates an accelerator even in a case in which the traveling speed of the vehicle is controlled based on a request from at least one of the application requesting units. If the driver requests acceleration of the vehicle through such an operation of the vehicle, such a request for acceleration by the driver needs to be reflected on the arbitration by the arbiter unit.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect of the present disclosure, a vehicle controller controls a traveling speed of a vehicle based on request values related to a longitudinal acceleration of the vehicle when receiving the request values from a driver assistance device. The vehicle controller is configured to receive, as the request values, a request value that defines an upper limit of the longitudinal acceleration and a request value that defines a lower limit of the longitudinal acceleration from the driver assistance device. The vehicle controller includes a setting unit, a first arbiter unit, a second arbiter unit, and a commanding unit. When obtaining the request value that defines the upper limit of the longitudinal acceleration, the setting unit sets an upper limit request value to a value that corresponds to the obtained request value. When obtaining the request value that defines the lower limit of the longitudinal acceleration, the setting unit sets a lower limit request value to a value that corresponds to the obtained request value. When a driver of the vehicle is requesting acceleration of the vehicle through an operation of the vehicle, the setting unit sets an acceleration request value to a request value related to the longitudinal acceleration that corresponds to an amount of the operation of the vehicle. The first arbiter unit sets a first arbitration request value to a greater one of the lower limit request value and the acceleration request value. The second arbiter unit sets a second arbitration request value to a smaller one of the first arbitration request value and the upper limit request value. The commanding unit sets, to a value that corresponds to the second arbitration request value, a command value sent to an actuator that operates to adjust the traveling speed.

In another general aspect of the present disclosure, a vehicle control method controls a traveling speed of a vehicle based on request values related to a longitudinal acceleration of the vehicle, the request values being provided by a driver assistance device. The request values include a request value that defines an upper limit of the longitudinal acceleration and a request value that defines a lower limit of the longitudinal acceleration. The vehicle control method includes: when the request value that defines the upper limit of the longitudinal acceleration is obtained, setting an upper limit request value to a value that corresponds to the obtained request value; when the request value that defines the lower limit of the longitudinal acceleration is obtained, setting a lower limit request value to a value that corresponds to the obtained request value; when a driver of the vehicle is requesting acceleration of the vehicle through an operation of the vehicle, setting an acceleration request value to a request value related to the longitudinal acceleration that corresponds to an amount of the operation of the vehicle; setting a first arbitration request value to a greater one of the lower limit request value and the acceleration request value; setting a second arbitration request value to a smaller one of the first arbitration request value and the upper limit request value; and setting, to a value that corresponds to the second arbitration request value, a command value sent to an actuator that operates to adjust the traveling speed.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle controller according to one embodiment will now be described with reference to FIGS. 1 to 7.

Figure 1:
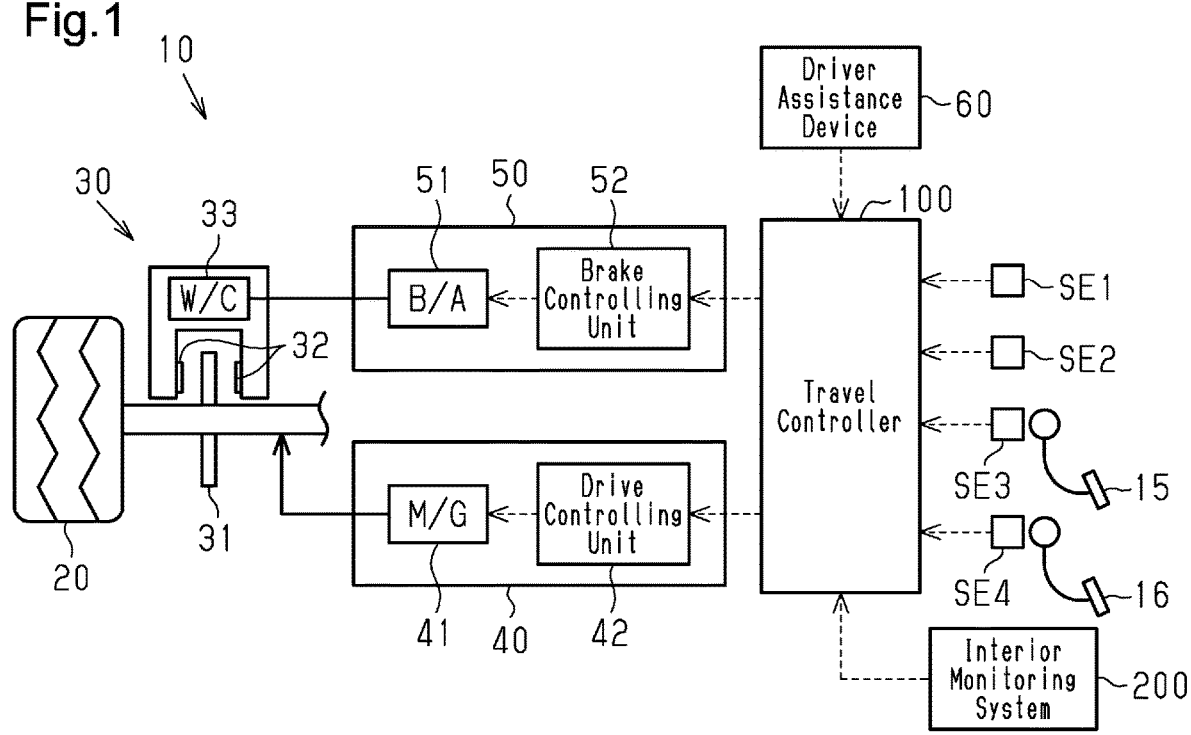
FIG. 1 is a diagram schematically showing a configuration of a vehicle equipped with a travel controller, which is a vehicle controller according to an embodiment.

FIG. 1 partially illustrates a vehicle 10 equipped with a travel controller 100, which is one example of the vehicle controller.

<Configuration of Vehicle 10>

The vehicle 10 includes wheels 20 and friction brakes 30, of which the number is the same as that of the wheels 20. The friction brakes 30 are braking mechanisms that generate frictional braking force at the wheels 20. Each friction brake 30 includes a rotor 31, which rotates integrally with the wheel 20, frictional members 32, and a wheel cylinder 33. When a WC pressure, which is liquid pressure in the wheel cylinder 33, is produced, the frictional members 32 are pressed against the rotor 31. This applies frictional braking force to the wheel 20. As the WC pressure increases, the force with which the frictional members 32 are pressed against the rotor 31 increases. Accordingly, the frictional braking force is increased.

The braking device 50 of the vehicle 10 includes a brake actuator 51, which supplies brake fluid to the wheel cylinders 33 of the friction brakes 30, and a brake controlling unit 52, which controls the brake actuator 51. The brake controlling unit 52 controls the brake actuator 51 so as to adjust the WC pressure in each wheel cylinder 33. That is, the brake controlling unit 52 adjusts the frictional braking force of the vehicle 10 by adjusting the WC pressure in the wheel cylinders 33. The frictional braking force of the vehicle 10 is the sum of the frictional braking forces applied to the wheels 20. In the present embodiment, the brake actuator 51 corresponds to an actuator that operates to adjust the frictional braking force of the vehicle 10, and the brake controlling unit 52 corresponds to a controlling unit that controls an actuator for braking.

A driving device 40 of the vehicle 10 includes a motor-generator 41, which is a drive source of the vehicle 10, and a drive controlling unit 42, which controls the motor-generator 41. Driving force of the motor-generator 41 is transmitted to the wheels 20, so that the vehicle 10 travels. As such, the motor-generator 41 corresponds to an actuator that operates to adjust the driving force of the vehicle 10, and the drive controlling unit 42 corresponds to a controlling unit that controls an actuator for driving the vehicle 10.

The vehicle 10 receives a longitudinal force when traveling. When the longitudinal force has a positive value, the vehicle 10 accelerates. When the longitudinal force has a negative value, the vehicle 10 decelerates. That is, the driving force of the vehicle 10 can be regarded as a positive longitudinal force, and the braking force of the vehicle 10 can be regarded as a negative longitudinal force. As such, the sum of the driving force and braking force of the vehicle 10 is referred to as a longitudinal force F in the present embodiment. When the absolute value of the driving force of the vehicle 10 is greater than the absolute value of the braking force so that the longitudinal force F has a positive value, the vehicle 10 accelerates. When the absolute value of the driving force of the vehicle 10 is less than the absolute value of the braking force so that the longitudinal force F has a negative value, the vehicle 10 decelerates.

<Detecting System of Vehicle 10>

The vehicle 10 includes multiple sensors that form a detecting system. For example, the vehicle 10 includes a wheel speed sensor SE1, a longitudinal acceleration sensor SE2, an accelerator operated amount sensor SE3, and a brake operated amount sensor SE4. The wheel speed sensor SE1 detects a rotation speed of a wheel 20 as a wheel speed Vw. The longitudinal acceleration sensor SE2 detects a detected acceleration value Gs, which is a longitudinal acceleration of on the vehicle 10. The accelerator operated amount sensor SE3 detects an accelerator operated amount Aa, which is an operated amount of an accelerator pedal 15 by the driver. The brake operated amount sensor SE4 detects a brake operated amount Ba, which is an operated amount of a brake pedal 16 by the driver. Signals corresponding to detected results of the sensors SE1 to SE4 are input to the travel controller 100.

The vehicle 10 includes an interior monitoring system 200, which is a detecting system. The interior monitoring system 200 monitors the condition of the driver of the vehicle 10. The interior monitoring system 200 includes, for example, an image capturing device that captures an image of the driver's face. In this case, the interior monitoring system 200 analyzes images captured by the image capturing device, thereby estimating whether the driver is conscious. The interior monitoring system 200 outputs such analysis results to the travel controller 100.

The analysis results by the interior monitoring system 200 are used to determine whether the driver has lost the ability to drive the vehicle 10. The interior monitoring system 200 may include a device other than the image capturing device as long as the interior monitoring system 200 can output information used to perform the determination to the travel controller 100.

<Control Configuration of Vehicle 10>

The vehicle 10 includes a driver assistance device 60 in addition to the travel controller 100.

<<Driver Assistance Device 60>>

The driver assistance device 60 includes a CPU, a first memory unit, and a second memory unit. The first memory unit includes a ROM that stores control programs executed by the CPU. The second memory unit stores calculation results of the CPU.

The driver assistance device 60 is not limited to processing circuitry that includes a CPU and a ROM and executes software processing. That is, the driver assistance device 60 may be modified as long as it has any one of the following configurations (a) to (c).

(a) Processing circuitry including one or more processors that execute various processes according to computer programs. The processor includes a CPU and a memory such as RAM and ROM. The memory stores program codes or instructions configured to cause the CPU to execute processes. The memory, which is a computer-readable medium, includes any type of media that are accessible by general-purpose computers and dedicated computers.

(b) Processing circuitry including one or more dedicated hardware circuits that execute various processes. The dedicated hardware circuits include, for example, an application specific integrated circuit (ASIC) and a field programmable gate array (FPGA).

(c) Processing circuitry including a processor that executes part of various processes according to programs and a dedicated hardware circuit that executes the remaining processes.

The driver assistance device 60 functions as several types of application requesting units by causing the CPU to execute control programs. The application requesting units are functional units that perform a driver assistance function for supporting the driver in driving the vehicle 10. The application requesting units output request values for performing the driver assistance function to the travel controller 100.

In the present embodiment, the driver assistance function adjusts the longitudinal acceleration of the vehicle 10. The driver assistance function includes adaptive cruise control, downhill assist control, collision mitigation braking, and autonomous driving.

The request values output by the application requesting units are request values related to the longitudinal acceleration of the vehicle 10. In the present embodiment, the application requesting units output a request value of the longitudinal force F as the request value related to the longitudinal acceleration. The request values output by the driver assistance device 60 to the travel controller 100 include a request value that determines an upper limit of the longitudinal acceleration of the vehicle 10 and a request value that determines a lower limit of the longitudinal acceleration of the vehicle 10.

The application requesting units include a first application requesting unit, which outputs a request value R1. The application requesting units include a second application requesting unit, which outputs a request value R2.

<<Travel Controller 100>>

The travel controller 100 includes a CPU, a first memory unit, and a second memory unit. The first memory unit includes a ROM that stores control programs executed by the CPU. The second memory unit stores calculation results of the CPU.

The travel controller 100 is not limited to a device that includes a CPU and a ROM and executes software processing. That is, the travel controller 100 may be modified as long as it has any one of the above-described configurations (a) to (c).

The travel controller 100 functions as several types of functional units by causing the CPU to execute control programs.

A functional configuration of the travel controller 100 will now be described with reference to FIG. 2.

The travel controller 100 functions as a drive request value calculating unit 110. The drive request value calculating unit 110 calculates a value greater than or equal to 0 as an acceleration request value Rx1. The drive request value calculating unit 110 calculates the acceleration request value Rx1 such that the acceleration request value Rx1 increases as the accelerator operated amount Aa increases.

The travel controller 100 functions as a braking request value calculating unit 120. The braking request value calculating unit 120 calculates a value less than or equal to 0 as a deceleration request value Rz1. That is, the braking request value calculating unit 120 calculates the deceleration request value Rz1 such that the deceleration request value Rz1 decreases as the brake operated amount Ba increases.

The travel controller 100 functions as a determining unit 130. The determining unit 130 determines whether the driver has lost the ability to drive the vehicle 10 based on information delivered by the interior monitoring system 200. For example, the determining unit 130 determines that the driver has lost the ability to drive the vehicle 10 when the driver is unconscious such as when the driver is asleep.

The travel controller 100 functions as a setting unit 140. The setting unit 140 sets an upper limit request value Rj, a lower limit request value Rk, an acceleration request value Rx, a deceleration request value Rz, and a replacement request value Rt.

Figure 3:
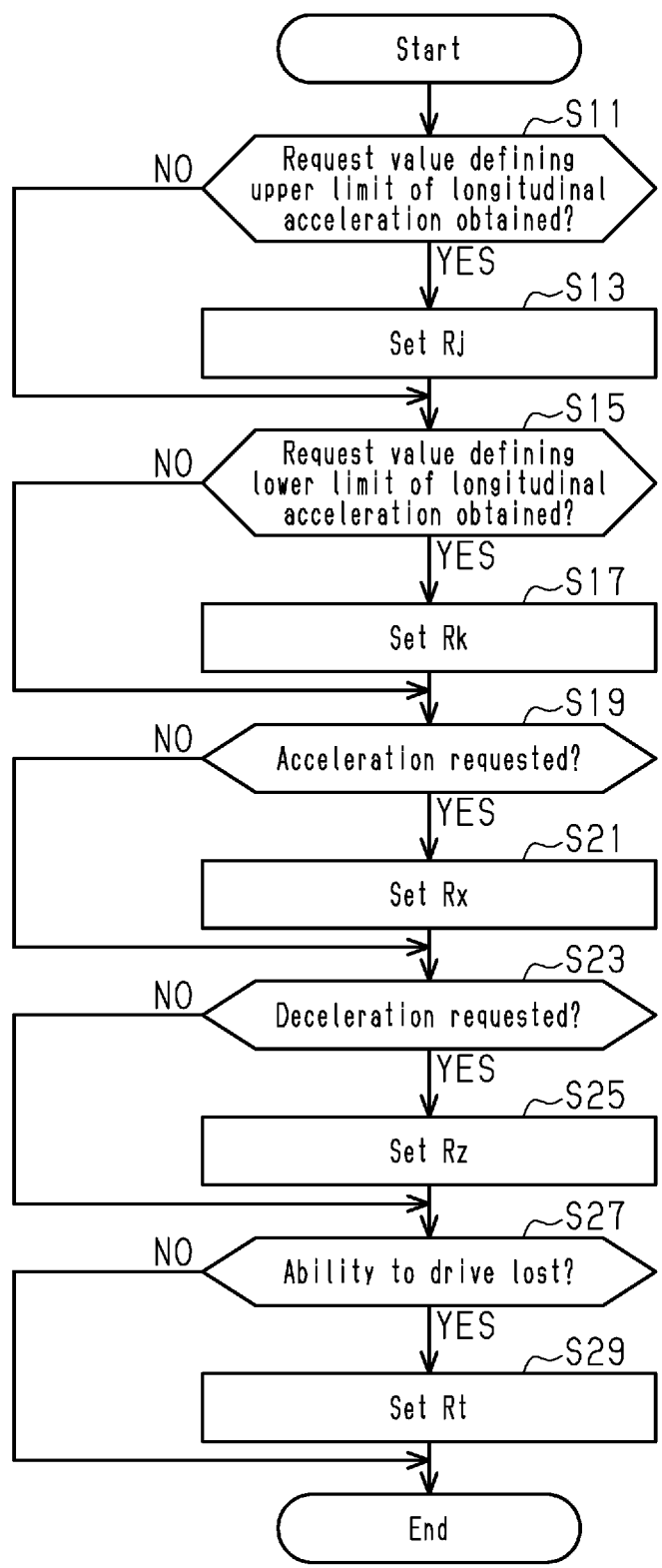
FIG. 3 is a flowchart illustrating a processing routine executed by a setting unit of the travel controller shown in FIG. 1.

With reference to FIG. 3, a processing routine executed by the travel controller 100 functioning as the setting unit 140 will be described. This processing routine is executed at predetermined control cycles.

In the first step S11 of this processing routine, the setting unit 140 determines whether it has obtained an upper limit setting request value from the driver assistance device 60. The upper limit setting request value defines an upper limit of the longitudinal acceleration of the vehicle 10. If the setting unit 140 has obtained the upper limit setting request value from the driver assistance device 60 (S11: YES), the setting unit 140 advances the process to step S13. In step S13, the setting unit 140 sets the upper limit request value Rj to a value that corresponds to the upper limit setting request value, which has been obtained from the driver assistance device 60. For example, if only one upper limit setting request value has been delivered from the driver assistance device 60, the setting unit 140 sets the upper limit request value Rj to the upper limit setting request value. Also, if two or more upper limit setting request values have been delivered from the driver assistance device 60, the setting unit 140 sets the upper limit request value Rj to the minimum value of the upper limit setting request values delivered from the driver assistance device 60. The setting unit 140 then advances the process to step S15.

If the setting unit 140 has not obtained the upper limit setting request value from the driver assistance device 60 in step S11 (NO), the setting unit 140 advances the process to step S15 without setting the upper limit request value Rj.

In step S15, the setting unit 140 determines whether it has obtained a lower limit setting request value from the driver assistance device 60. The lower limit setting request value defines a lower limit of the longitudinal acceleration of the vehicle 10. If the setting unit 140 has obtained the lower limit setting request value from the driver assistance device 60 (S15: YES), the setting unit 140 advances the process to step S17. In step S17, the setting unit 140 sets the lower limit request value Rk to a value that corresponds to the lower limit setting request value, which has been obtained from the driver assistance device 60. For example, if only one lower limit setting request value has been delivered from the driver assistance device 60, the setting unit 140 sets the lower limit request value Rk to the lower limit setting request value. Also, if two or more lower limit setting request values have been delivered from the driver assistance device 60, the setting unit 140 sets the lower limit request value Rk to the minimum value of the lower limit setting request values. The setting unit 140 then advances the process to step S19.

If the setting unit 140 has not obtained the lower limit setting request value from the driver assistance device 60 in step S15 (NO), the setting unit 140 advances the process to step S19 without setting the lower limit request value Rk.

In step S19, the setting unit 140 determines whether the driver has requested acceleration of the vehicle 10 through operation of the vehicle 10. The setting unit 140 determines whether the driver has requested acceleration of the vehicle 10 through operation of the vehicle 10 based on at least one of the acceleration request value Rx1, which has been calculated by the drive request value calculating unit 110, and the accelerator operated amount Aa. When determining that the driver has requested acceleration of the vehicle 10 through operation of the vehicle 10 (S19: YES), the setting unit 140 advances the process to step S21. In step S21, the setting unit 140 sets the acceleration request value Rx to the acceleration request value Rx1. The setting unit 140 then advances the process to step S23.

When determining that the driver has not requested acceleration of the vehicle 10 through operation of the vehicle 10 in step S19 (NO), the setting unit 140 advances the process to step S23 without setting the acceleration request value Rx.

In step S23, the setting unit 140 determines whether the driver has requested deceleration of the vehicle 10 through operation of the vehicle 10. The setting unit 140 determines whether the driver has requested deceleration of the vehicle 10 through operation of the vehicle 10 based on at least one of the deceleration request value Rz1, which has been calculated by the braking request value calculating unit 120, and the brake operated amount Ba. When determining that the driver has requested deceleration of the vehicle 10 through operation of the vehicle 10 (S23: YES), the setting unit 140 advances the process to step S25. In step S25, the setting unit 140 sets the deceleration request value Rz to the deceleration request value Rz1. The setting unit 140 then advances the process to step S27.

When determining that the driver has not requested deceleration of the vehicle 10 through operation of the vehicle 10 in step S23 (NO), the setting unit 140 advances the process to step S27 without setting the deceleration request value Rz.

In step S27, the setting unit 140 determines whether the determining unit 130 has determined that the driver has lost the ability to drive the vehicle 10. If the determining unit 130 has determined that the driver has lost the ability to drive the vehicle 10 (S27: YES), the setting unit 140 advances the process to step S29. In step S29, the setting unit 140 sets the replacement request value Rt. The replacement request value Rt is set to a value that is unrelated to the amount of operation of the vehicle 10 by the driver. That is, even if the accelerator pedal 15 or the brake pedal 16 is operated by the driver, the replacement request value Rt is set to a value unrelated to the accelerator operated amount Aa or the brake operated amount Ba. For example, the replacement request value Rt is set to a value that allows the vehicle 10 to be stopped while ensuring the safety of the vehicle 10. In this case, the setting unit 140 preferably sets the replacement request value Rt to a value that is determined by taking into consideration the type of the road on which the vehicle 10 is traveling and a traveling speed Vs of the vehicle 10. The replacement request value Rt, which is set in the above-described manner, is related to the longitudinal acceleration of the vehicle 10. Then, the setting unit 140 temporarily ends the current processing routine.

If the determining unit 130 has not determined that the driver has lost the ability to drive the vehicle 10 in step S27 (NO), the setting unit 140 temporarily ends the current processing routine without setting the replacement request value Rt.

Figure 2:
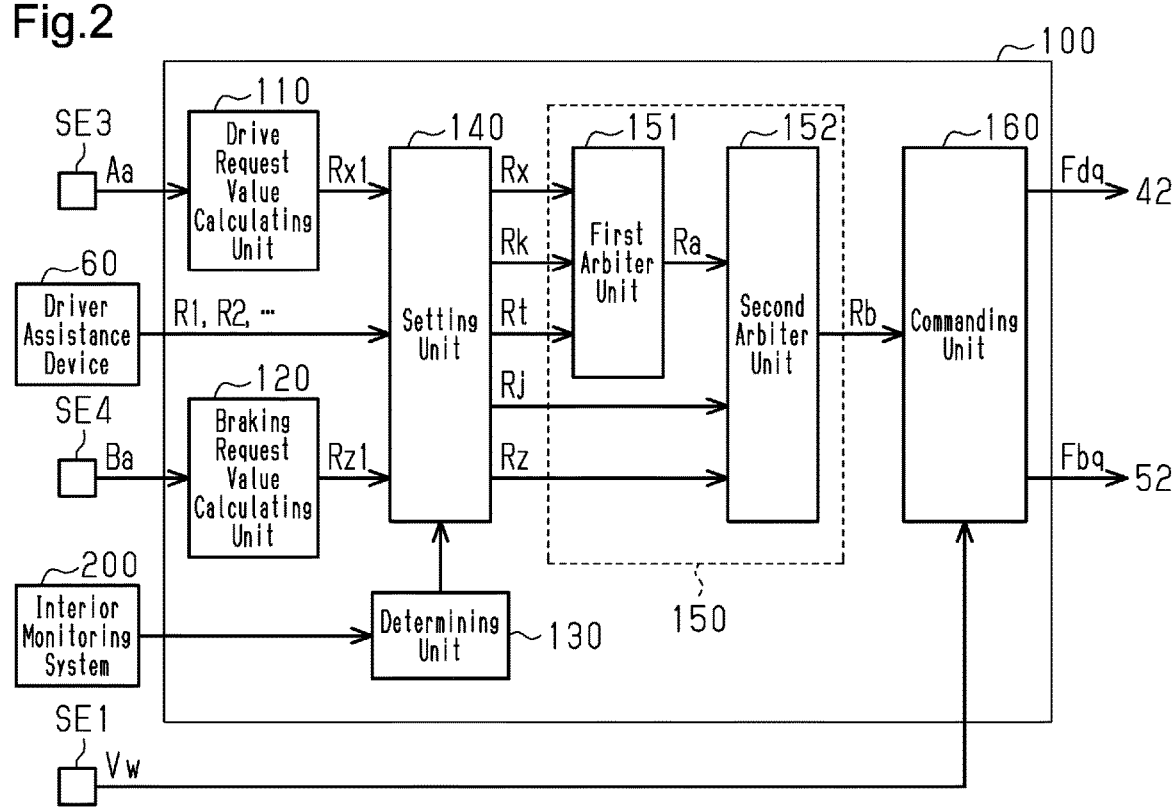
FIG. 2 is a block diagram showing a functional configuration of the travel controller shown in FIG. 1.

Referring to FIG. 2, the travel controller 100 functions as an arbiter unit 150. The arbiter unit 150 includes a first arbiter unit 151 and a second arbiter unit 152.

The first arbiter unit 151 sets a first arbitration request value Ra based on the lower limit request value Rk, the acceleration request value Rx, and the replacement request value Rt. When the setting unit 140 has set the replacement request value Rt, the first arbiter unit 151 sets the first arbitration request value Ra to the replacement request value Rt.

Figure 4:
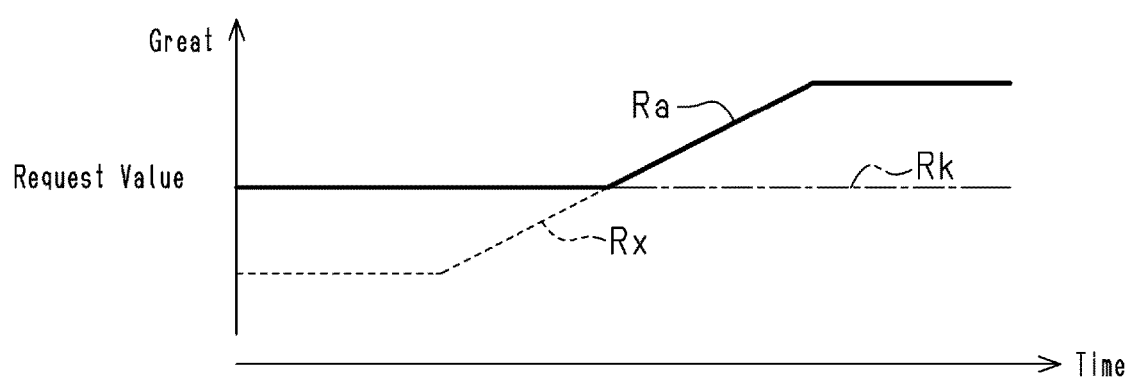
FIG. 4 is a diagram showing a manner in which a first arbitration request value is set by a first arbiter unit of the travel controller shown in FIG. 1.

When the setting unit 140 has not set the replacement request value Rt, the first arbiter unit 151 sets the first arbitration request value Ra to the lower limit request value Rk or the acceleration request value Rx as shown in FIG. 4. That is, when both the lower limit request value Rk and the acceleration request value Rx are set, the first arbiter unit 151 sets the first arbitration request value Ra to the greater one of the lower limit request value Rk and the acceleration request value Rx. When the lower limit request value Rk is set, but the acceleration request value Rx is not set, the first arbiter unit 151 sets the first arbitration request value Ra to the lower limit request value Rk. Also, when the lower limit request value Rk is not set, but the acceleration request value Rx is set, the first arbiter unit 151 sets the first arbitration request value Ra to the acceleration request value Rx.

When none of the replacement request value Rt, the lower limit request value Rk, and the acceleration request value Rx is set, the first arbiter unit 151 does not set the first arbitration request value Ra.

Referring to FIG. 2, the second arbiter unit 152 sets a second arbitration request value Rb based on the first arbitration request value Ra, the upper limit request value Rj, and the deceleration request value Rz. When the first arbitration request value Ra, the upper limit request value Rj, and the deceleration request value Rz are all set, the second arbiter unit 152 sets the second arbitration request value Rb to the minimum value of the first arbitration request value Ra, the upper limit request value Rj, and the deceleration request value Rz.

Figure 5:
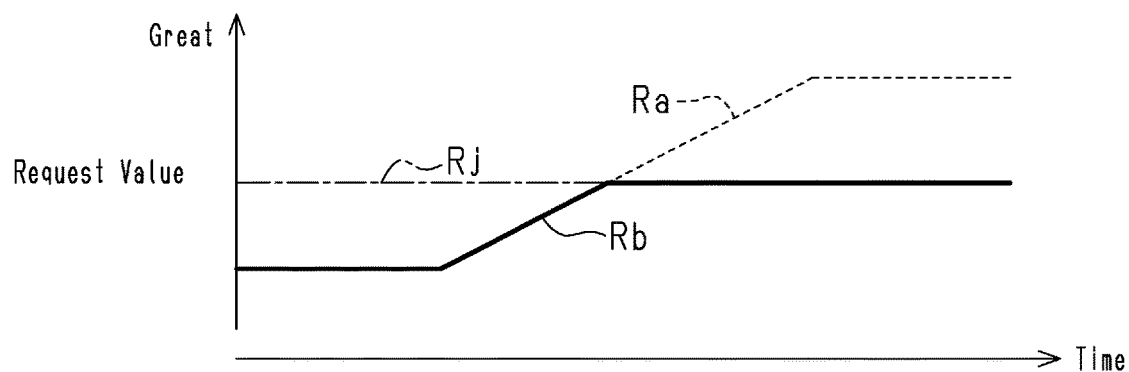
FIG. 5 is a diagram showing a manner in which a second arbitration request value is set by a second arbiter unit of the travel controller shown in FIG. 1.

When only one of the first arbitration request value Ra, the upper limit request value Rj, and the deceleration request value Rz is set, the second arbiter unit 152 sets the second arbitration request value Rb to that one of the request values. When only two of the first arbitration request value Ra, the upper limit request value Rj, and the deceleration request value Rz are set, the second arbiter unit 152 sets the second arbitration request value Rb to the smaller one of the set request values. For example, when the first arbitration request value Ra and the upper limit request value Rj are set, but the deceleration request value Rz is not set, the second arbiter unit 152 sets the second arbitration request value Rb to the smaller one of the first arbitration request value Ra and the upper limit request value Rj as shown in FIG. 5.

Referring to FIG. 2, the travel controller 100 functions as a commanding unit 160. The commanding unit 160 sets a command value Fq of the longitudinal force to a value that corresponds to the second arbitration request value Rb. The commanding unit 160 then outputs the command value Fq to the drive controlling unit 42 of the driving device 40 or the brake controlling unit 52 of the braking device 50. The command value Fq includes a driving command value Fdq for the driving device 40 and a braking command value Fbq for the braking device 50. For example, if the command value Fq of the longitudinal force has a positive value, the commanding unit 160 outputs the command value Fq to the drive controlling unit 42 as the driving command value Fdq. Also, for example, if the command value Fq of the longitudinal force has a negative value, the commanding unit 160 outputs the command value Fq to the brake controlling unit 52 as the braking command value Fbq.

Figure 6:
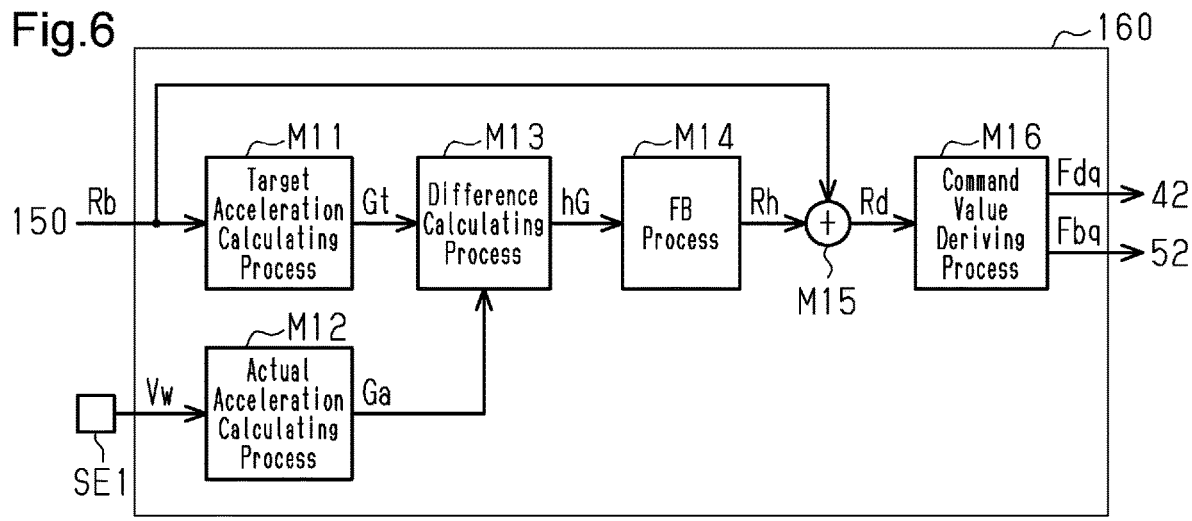
FIG. 6 is a block diagram illustrating processes executed by a commanding unit of the travel controller shown in FIG. 1.

Referring to FIG. 6, a process for deriving the driving command value Fdq and the braking command value Fbq will be described.

The commanding unit 160 executes a target acceleration calculating process M11, which converts the second arbitration request value Rb, which is a request value of the longitudinal force F, to a request value of acceleration. In the target acceleration calculating process M11, the commanding unit 160 converts the second arbitration request value Rb into an acceleration, thereby calculating an arbitrated acceleration request value Gt.

Based on the wheel speed Vw, the commanding unit 160 executes an actual acceleration calculating process M12, which calculates an actual acceleration Ga of the vehicle 10. That is, in the actual acceleration calculating process M12, the commanding unit 160 calculates the traveling speed Vs of the vehicle 10 based on the wheel speed Vw of each wheel 20. The commanding unit 160 then performs temporal differentiation of the traveling speed Vs, thereby calculating the actual acceleration Ga. When the actual acceleration Ga is calculated in the above-described manner, the commanding unit 160 may use a detected acceleration value Gs in addition to the value obtained through temporal differentiation of the traveling speed Vs.

The commanding unit 160 executes a difference calculating process M13, which calculates a difference hG between the arbitrated acceleration request value Gt and the actual acceleration Ga.

The commanding unit 160 executes an FB process M14, which performs a feedback control using the difference hG as an input. The value obtained through execution of the FB process M14 is referred to as an FB value Rh. The feedback control includes, for example, proportionality control and derivative control. The feedback control may include an integral control.

The commanding unit 160 executes an adding process M15, which calculates the sum of the second arbitration request value Rb and the FB value Rh as a final acceleration request value Rd.

The commanding unit 160 executes a command value deriving process M16, which converts the final acceleration request value Rd into a longitudinal force, thereby calculating the driving command value Fdq or the braking command value Fbq. In this manner, the driving command value Fdq and the braking command value Fbq are set to values that correspond to the second arbitration request value Rb.

Operation and Advantages of Present Embodiment

Figure 7:
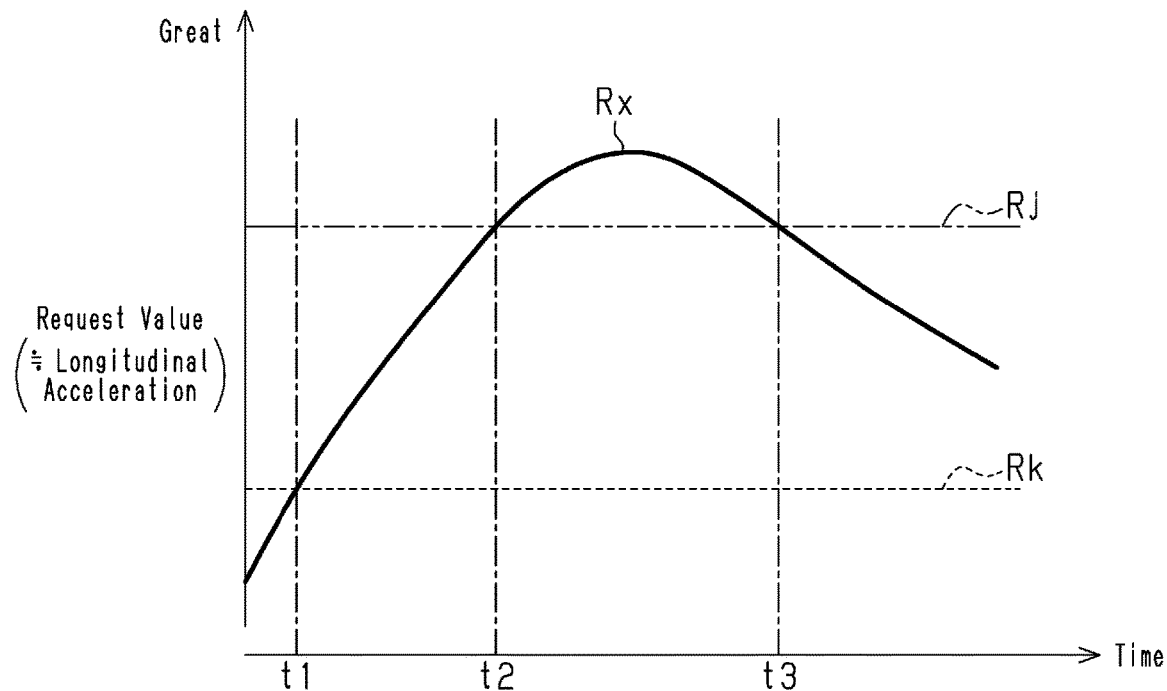
FIG. 7 is a timing diagram showing changes in an acceleration request value when the driver operates an accelerator pedal in a situation in which an upper limit request value and a lower limit request value are set.

With reference to FIG. 7, a case will be described in which the driver is operating the accelerator pedal 15 with the upper limit request value Rj and the lower limit request value Rk being set. For illustrative purposes, FIG. 7 illustrates a situation in which the upper limit request value Rj and the lower limit request value Rk are respectively maintained at certain values.

When the driver is operating the accelerator pedal 15, the acceleration request value Rx is set to a value that corresponds to the accelerator operated amount Aa. In this case, the second arbitration request value Rb is set based on the acceleration request value Rx, the upper limit request value Rj, and the lower limit request value Rk. Also, the driving command value Fdq or the braking command value Fbq is set to a value that corresponds to the second arbitration request value Rb. When the driving command value Fdq is output to the drive controlling unit 42, the drive controlling unit 42 controls the motor-generator 41 based on the driving command value Fdq. Also, when the braking command value Fbq is output to the brake controlling unit 52, the brake controlling unit 52 controls the brake actuator 51 based on the braking command value Fbq.

For example, when the acceleration request value Rx is less than both the lower limit request value Rk and the upper limit request value Rj as in the period prior to point in time t1, the first arbitration request value Ra is set to the lower limit request value Rk out of the lower limit request value Rk and the acceleration request value Rx. Also, the second arbitration request value Rb is set to the smaller one of the first arbitration request value Ra and the upper limit request value Rj. In the example shown in FIG. 7, since the lower limit request value Rk is less than the upper limit request value Rj, the second arbitration request value Rb is set to the lower limit request value Rk. Thus, the driving command value Fdq or the braking command value Fbq is set to a value that corresponds to the lower limit request value Rk.

Also, in the example shown in FIG. 7, the second arbitration request value Rb is set to the acceleration request value Rx in the period from point in time t1 to point in time t2 and in a period from point in time t3. As a result, the driving command value Fdq or the braking command value Fbq is set to a value that corresponds to the acceleration request value Rx.

In this manner, when the second arbitration request value Rb is set to the acceleration request value Rx, a change in the accelerator operated amount Aa due to operation of the accelerator pedal 15 by the driver changes the acceleration request value Rx and the second arbitration request value Rb. As a result, the driving command value Fdq or the braking command value Fbq is changed in conjunction with the change in the accelerator operated amount Aa. Accordingly, the traveling speed Vs of the vehicle 10 is changed in accordance with operation of the accelerator pedal 15 by the driver.

In the period from point in time t2 to point in time t3, the acceleration request value Rx is greater than the lower limit request value Rk and the upper limit request value Rj. In the example shown in FIG. 7, the second arbitration request value Rb is set to the upper limit request value Rj. As a result, the driving command value Fdq or the braking command value Fbq is set to a value that corresponds to the upper limit request value Rj.

In the present embodiment, the second arbitration request value Rb is set based on the upper limit request value Rj, the lower limit request value Rk, and the acceleration request value Rx. If the accelerator operated amount Aa is changed when the second arbitration request value Rb is set to the acceleration request value Rx, the second arbitration request value Rb is changed in accordance with a change in the accelerator operated amount Aa. As a result, the driving command value Fdq or the braking command value Fbq is changed. That is, depending on the accelerator operated amount Aa, the command value Fq of the longitudinal force is set in accordance with the acceleration request value Rx, or the command value Fq of the longitudinal force is set in accordance with the upper limit request value Rj or the lower limit request value Rk.

Therefore, if the driver requests acceleration of the vehicle 10 through operation of the accelerator pedal 15 when the vehicle 10 is traveling in accordance with a request from the driver assistance device 60, the longitudinal acceleration of the vehicle 10 is controlled with the request for acceleration by the driver taken into account.

The present embodiment further has the following advantages.

(1) The driver may operate the brake pedal 16 in a situation in which the traveling speed Vs of the vehicle 10 is controlled according to a request from the driver assistance device 60. When the driver requests deceleration of the vehicle 10 through vehicle operation, that is, through operation of the brake pedal 16, the deceleration request value Rz is set. When both the upper limit request value Rj and the lower limit request value Rk are set, the second arbitration request value Rb is set based on the upper limit request value Rj, the lower limit request value Rk, and the deceleration request value Rz. Specifically, the second arbitration request value Rb is set to the minimum value of the upper limit request value Rj, the lower limit request value Rk, and the deceleration request value Rz. That is, when the deceleration request value Rz is less than both the upper limit request value Rj and the lower limit request value Rk, the second arbitration request value Rb is changed in accordance with changes in the brake operated amount Ba. Therefore, if the driver requests deceleration of the vehicle 10 through operation of the brake pedal 16 when the vehicle 10 is traveling in accordance with a request from the driver assistance device 60, the longitudinal acceleration of the vehicle 10 is controlled with the request for deceleration by the driver taken into account.

(2) The replacement request value Rt is set when it is determined that the driver has lost the ability to drive the vehicle 10. When the replacement request value Rt is set, the first arbitration request value Ra is set to the replacement request value Rt. The second arbitration request value Rb is set to the smaller one of the replacement request value Rt and the upper limit request value Rj. The replacement request value Rt is set to value for decelerating the vehicle 10. Accordingly, the command value Fq of the longitudinal force is set to a value that corresponds to the second arbitration request value Rb. The motor-generator 41 and the brake actuator 51 operate based on the command value Fq. Thus, if it is determined that the driver has lost the ability to drive the vehicle 10, the vehicle 10 is prevented from accelerating.

<Modifications>

The above-described embodiment may be modified as follows. The above-described embodiment and the following modifications can be combined as long as the combined modifications remain technically consistent with each other.

In the above-described embodiment, when the replacement request value Rt is set because of the determination that the driver has lost the ability to drive the vehicle 10, the second arbitration request value Rb may be set to the replacement request value Rt regardless whether the replacement request value Rt is greater than the upper limit request value Rj.

The replacement request value Rt may be set to a predetermined value that is determined in advance.

The travel controller 100 does not necessarily need to function as the determining unit 130. For example, the driver assistance device 60 may function as the determining unit 130. In such a case, when the driver assistance device 60 receives information indicating that the driver has lost the ability to drive the vehicle 10, the travel controller 100 sets the replacement request value Rt.

The travel controller 100 may include an ECU that functions as the brake controlling unit 52. Also, an ECU that functions as the brake controlling unit 52 may include part of the functional units of the travel controller 100. In this case, the ECU that functions as the drive controlling unit 42 may have the remaining functional units of the travel controller 100.

The above-described embodiment describes a case in which the travel controller 100 receives a request value of the longitudinal force from the driver assistance device 60. However, the request value delivered from the driver assistance device 60 to the travel controller 100 does not necessarily need to be the request value of the longitudinal force as long as the request value is related to the longitudinal acceleration of the vehicle 10. For example, the request value delivered from the driver assistance device 60 to the travel controller 100 may be a request value of the longitudinal acceleration.

The driving device 40 may include an engine in addition to the motor-generator 41 as a drive source of the vehicle 10. Also, the driving device 40 does not necessarily include the motor-generator 41 if it includes an engine as a drive source of the vehicle 10.

The braking device 50 does not necessarily need to use brake fluid if it is capable of adjusting frictional braking force. For example, the braking device 50 may be an electric braking device. Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller that controls a traveling speed of a vehicle based on request values related to a longitudinal acceleration of the vehicle when receiving the request values from a driver assistance device, wherein the vehicle controller is configured to receive, as the request values, a request value that defines an upper limit of the longitudinal acceleration and a request value that defines a lower limit of the longitudinal acceleration from the driver assistance device, and the vehicle controller comprises:

a setting unit that, when obtaining the request value that defines the upper limit of the longitudinal acceleration, the setting unit sets an upper limit request value to a value that corresponds to the obtained request value, when obtaining the request value that defines the lower limit of the longitudinal acceleration, the setting unit sets a lower limit request value to a value that corresponds to the obtained request value, and when a driver of the vehicle is requesting acceleration of the vehicle through an operation of the vehicle, the setting unit sets an acceleration request value to a request value related to the longitudinal acceleration that corresponds to an amount of the operation of the vehicle;

a first arbiter unit that sets a first arbitration request value to a greater one of the lower limit request value and the acceleration request value;

a second arbiter unit that sets a second arbitration request value to a smaller one of the first arbitration request value and the upper limit request value; and a commanding unit that sets, to a value that corresponds to the second arbitration request value, a command value sent to an actuator that operates to adjust the traveling speed.

2. The vehicle controller according to claim 1, comprising:

a determining unit that determines whether the driver has lost an ability to drive the vehicle, wherein, when the determining unit determines that the driver has lost the ability to drive the vehicle, the first arbiter unit sets the first arbitration request value to a replacement request value that is unrelated to an amount of the operation of the vehicle by the driver.

3. A vehicle control method that controls a traveling speed of a vehicle based on request values related to a longitudinal acceleration of the vehicle, the request values being provided by a driver assistance device, wherein the request values include a request value that defines an upper limit of the longitudinal acceleration and a request value that defines a lower limit of the longitudinal acceleration, and the vehicle control method comprises:

when the request value that defines the upper limit of the longitudinal acceleration is obtained, setting an upper limit request value to a value that corresponds to the obtained request value;

when the request value that defines the lower limit of the longitudinal acceleration is obtained, setting a lower limit request value to a value that corresponds to the obtained request value;

when a driver of the vehicle is requesting acceleration of the vehicle through an operation of the vehicle, setting an acceleration request value to a request value related to the longitudinal acceleration that corresponds to an amount of the operation of the vehicle;

setting a first arbitration request value to a greater one of the lower limit request value and the acceleration request value;

setting a second arbitration request value to a smaller one of the first arbitration request value and the upper limit request value; and setting, to a value that corresponds to the second arbitration request value, a command value sent to an actuator that operates to adjust the traveling speed.

* * * * *